United States Patent
Baars et al.

(10) Patent No.: US 9,417,985 B2
(45) Date of Patent: Aug. 16, 2016

(54) DISTRIBUTED ANALYSIS AND ATTRIBUTION OF SOURCE CODE

(71) Applicant: SEMMLE LIMITED, Oxford (GB)

(72) Inventors: Arthur Baars, Oxford (GB); Anders Starcke Henriksen, Oxford (GB); Max Schaefer, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/940,882

(22) Filed: Nov. 13, 2015

(65) Prior Publication Data

US 2016/0140015 A1    May 19, 2016

Related U.S. Application Data

(60) Provisional application No. 62/080,188, filed on Nov. 14, 2014, provisional application No. 62/254,620, filed on Nov. 12, 2015.

(51) Int. Cl.
| | | |
|---|---|---|
| *G06F 17/30* | (2006.01) | |
| *G06F 9/44* | (2006.01) | |
| *G06F 11/36* | (2006.01) | |

(52) U.S. Cl.
CPC .............. *G06F 11/3608* (2013.01); *G06F 8/71* (2013.01); *G06F 8/751* (2013.01); *G06F 8/77* (2013.01); *G06F 11/3604* (2013.01); *G06F 11/3612* (2013.01); *G06F 11/3616* (2013.01)

(58) Field of Classification Search
CPC . G06F 9/4428; G06F 9/4436; G06F 9/45508; G06F 11/3608; G06F 11/3616; G06F 8/71; G06F 8/75; G06F 8/77
See application file for complete search history.

(56) References Cited

U.S. PATENT DOCUMENTS

| | | | | |
|---|---|---|---|---|
| 6,536,037 | B1* | 3/2003 | Guheen | G06F 8/71 703/2 |
| 7,003,777 | B2* | 2/2006 | Hines | G06F 8/36 709/223 |
| 8,032,863 | B2* | 10/2011 | Kolawa | G06F 11/3616 717/124 |
| 8,856,764 | B2 | 10/2014 | Pistoia et al. | |
| 8,949,769 | B2* | 2/2015 | Biehl | G06F 8/71 717/101 |
| 8,949,802 | B1 | 2/2015 | van Gogh et al. | |
| 9,208,056 | B1* | 12/2015 | Henriksen | G06F 11/3604 |

(Continued)

FOREIGN PATENT DOCUMENTS

EP    2937779    10/2015

OTHER PUBLICATIONS

Miljenovic et al., The SourceGraph program, Jan. 2010, 4 pages.*

(Continued)

*Primary Examiner* — Thuy Dao
(74) *Attorney, Agent, or Firm* — Fish & Richardson P.C.

(57) ABSTRACT

Methods, systems, and apparatus, including computer programs encoded on computer storage media, for distributing analysis tasks and attribution tasks. One of the methods includes receiving data representing a plurality of snapshots of a code base, wherein each snapshot comprises source code files, wherein one or more snapshots have a parent snapshot in the code base according to a revision graph of snapshots in the code base. An attribution set is generated from the plurality of snapshots, the attribution set having a target set of attributable snapshots to be attributed and a support set of all parent snapshots of all snapshots in the target set. An attribution task is distributed for the attribution set to a particular worker node of a plurality of worker nodes.

55 Claims, 9 Drawing Sheets

(56) References Cited

U.S. PATENT DOCUMENTS

| | | | |
|---|---|---|---|
| 2007/0288899 A1 | 12/2007 | Fanning et al. | |
| 2010/0275186 A1 | 10/2010 | McGarvey et al. | |
| 2011/0154120 A1 | 6/2011 | Kim et al. | |
| 2014/0297592 A1* | 10/2014 | Ohtake | G06F 17/30309 707/638 |
| 2014/0380276 A1* | 12/2014 | Matthiesen | G06F 8/75 717/123 |
| 2016/0139917 A1* | 5/2016 | Tibble | G06F 8/75 717/121 |

OTHER PUBLICATIONS

Angerer et al., Identifying inactive code in product lines with configuration-aware system dependence graphs, Sep. 2014, 10 pages.*

Extended European Search Report issued in European Application No. 15194482.4 on Apr. 20, 2016, 14 pages.

Kim and Notkin, "Program element matching for multi-version program analyses," Proceedings of the 2006 International Workshop on Mining Software Repositories MSR '06, Jan. 1, 2006, pp. 58-64, XP055127769.

Palix et al., "Tracking code patterns over multiple software versions with Herodotos," Proceedings of the Eighth International Conference on Aspect-Oriented Software Development, AOSD '10, Mar. 15, 2010, pp. 169-180, XP05521254.

Spacco et al., "Tracking defect warnings across versions," Proceedings of the 2006 International Workshop on Mining Software Repositories MSR '06, May 22, 2006, pp. 133-136, XP055212551.

* cited by examiner

DISTRIBUTED ANALYSIS AND ATTRIBUTION OF SOURCE CODE

BACKGROUND

This specification relates to static analysis of computer software source code.

Static analysis refers to techniques for analyzing computer software source code without executing the source code as a computer software program.

Source code in a code base is typically maintained by developers using a version control system. Version control systems generally maintain multiple revisions of the source code in the code base, each revision being referred to as a snapshot. Each snapshot includes the source code of files of the code base as the files existed at a particular point in time, or data from which those source code files can be reconstructed.

Relationships among snapshots of the source code base can be represented as a directed acyclic revision graph. Each node in the revision graph represents a commit of the source code. A commit represents a snapshot as well as information about ancestor snapshots of the node in the revision graph. A directed edge from a first node to a second node in the revision graph indicates that a snapshot of the commit represented by the first node is a previous snapshot of a snapshot of the commit represented by the second node.

Identifying characteristic segments of source code is a task that will be referred to as analysis. A characteristic segment of source code is a segment of source code having a particular attribute. For example, an analysis task can identify source code segments that include violations of a particular coding standard, e.g., a segment of source code that compares variables of different types. Analysis tasks may build source code of a particular snapshot, e.g., by compiling source code files and linking resulting object files and libraries. Analysis tasks can then identify characteristic segments of source code by examining relationships between source code constructs in the snapshot, e.g., between variables, functions, and classes.

Identifying a responsible entity for each characteristic segment of source code is a task that will be referred to as attribution. Attribution for a particular snapshot generally includes comparing the characteristic source code segments that occur in the snapshot with characteristic source code segments found in each of one or more parent snapshots. For example, if a violation is absent in a parent snapshot, but occurs in a snapshot that is a child of the parent snapshot according to a revision graph, the violation may be attributed to a developer who committed the child snapshot.

SUMMARY

This specification describes a distributed static analysis system that can use multiple worker computing nodes operating concurrently to perform analysis and attribution of source code. A manager node distributes, or advertises the availability of, analysis tasks and attribution tasks to multiple worker nodes in the system.

Particular embodiments of the subject matter described in this specification can be implemented so as to realize one or more of the following advantages. A system can leverage many worker nodes to quickly and concurrently analyze and attribute very large code bases with many snapshots. A system can begin producing intermediate results that can be analyzed before processing all snapshots of the code base. A system can reduce the cost of data transfer associated with attributing snapshots in large code bases by building large attribution sets.

In addition, a system can perform analysis tasks and attribution tasks by manager nodes advertising lists of available tasks to worker nodes. Manager nodes then need not maintain or consider the analysis and attribution capabilities of worker nodes. Worker nodes can be added or removed from a pool of worker nodes without affecting the manager nodes. Multiple manager nodes can share the same worker pool without coordinating with each other, without interfering with each other, and without overloading any of the individual worker nodes. Worker nodes are free to implement caching strategies without manager nodes having to be aware of caching.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Performing analysis and attribution of snapshots in a code base can be computationally expensive, particularly for large code bases having many snapshots.

Figure 1:
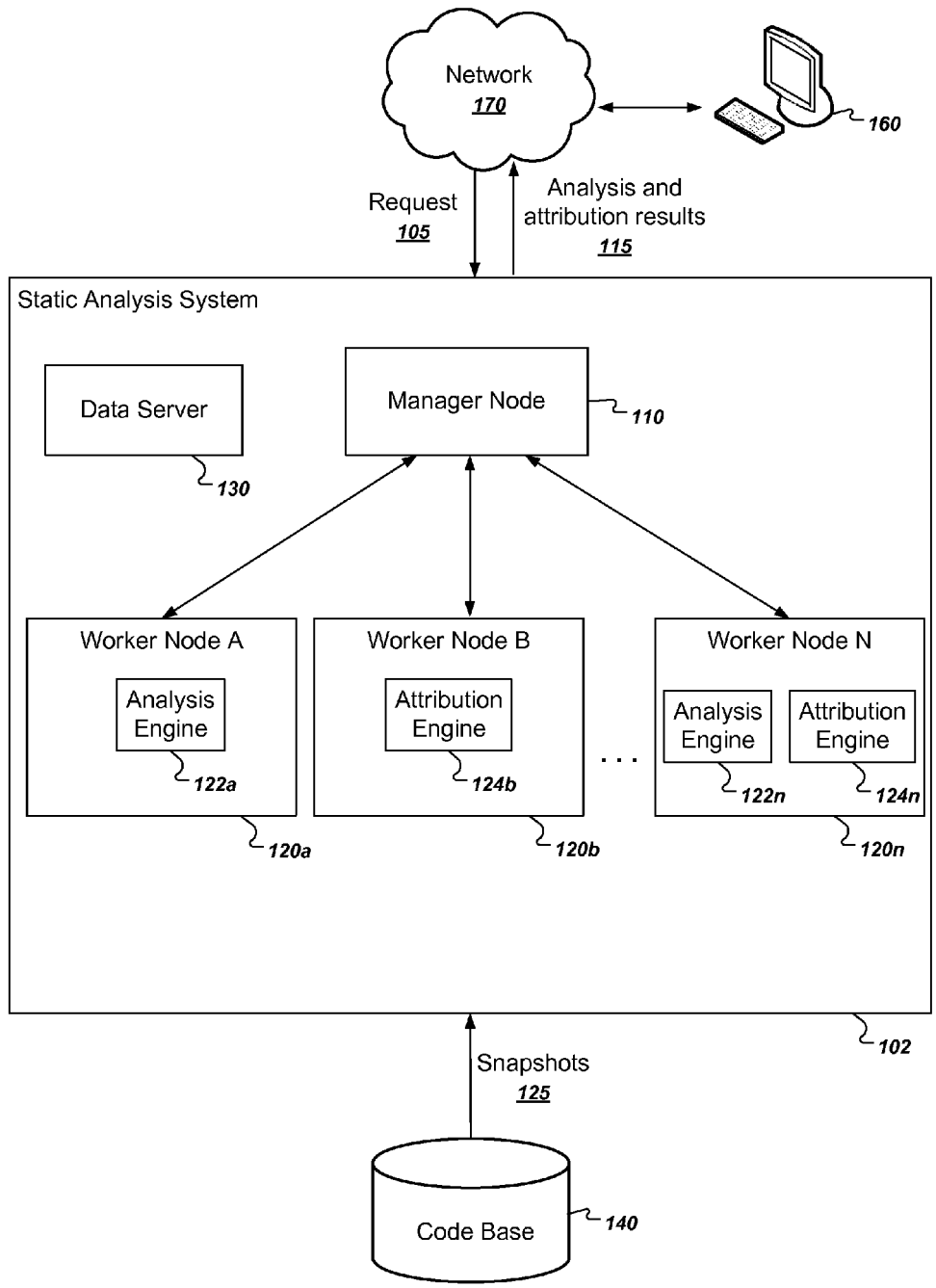
FIG. 1 illustrates an example static analysis system.

FIG. 1 illustrates an example static analysis system 102 in context that employs multiple worker computing nodes to perform analysis tasks and attribution tasks concurrently. The context includes a user device 160 in communication with the static analysis system 102 over a network, 170, which can be any appropriate data communications network. The static analysis system 102 includes a manager node 110 and multiple worker nodes 120a, 120b, through 120n. Although only three worker nodes are shown, the system can include many more, e.g., thousands, of worker nodes. The static analysis system also includes a data server 130.

The components of the static analysis system 102 can be implemented as computer programs installed on one or more computers in one or more locations that are coupled to each other through a network. Multiple instances of the worker nodes 120a-n can be implemented as virtual machines installed on a single physical computing node. Each of the worker nodes 120a-n has an analysis engine, e.g., the analysis engine 122a, an attribution engine, e.g., the attribution engine 124b, or both. For example, the worker node 120a has only an analysis engine, the worker node 120b has only an attribution engine, and the worker node 120n has both.

In general, to perform an analysis task, the analysis engines 122a-n analyze source code of a single snapshot of the code base 140. The output of an analysis task includes analysis data that identifies characteristic source code segments of the snapshot and data specifying where, in the snapshot, the characteristic source code segments occur. For simplicity, the examples below will refer to identifying, as characteristic segments, source code segments that have coding defects that violate one or more source code coding standards. However, the same techniques can be applied for other analysis tasks that identify other characteristic source code segments of snapshots of a code base.

Each of the worker nodes 120a-n having an analysis engine can provide the output of an analysis task to the manager node 110 for further processing, or each worker node can communicate with a data server 130 to store the output of an analysis task in a data storage subsystem, e.g., for later retrieval by the manager node 110.

Each of the worker nodes having an attribution engine performs attribution tasks on snapshots 125 of the code base 140. An attribution engine can perform an attribution task on one or multiple snapshots by attributing characteristic segments of source code occurring in the one snapshot or multiple snapshots. In general, to perform attribution task for a first snapshot, an attribution engine operates on the already-analyzed first snapshot and all of one or more already-analyzed parent snapshots of the first snapshot. Thus, an attribution engine may not be able to perform an attribution task for the first snapshot if one or more parent snapshots of the first snapshot have not been analyzed.

The output of an attribution task includes, for each characteristic segment occurring in an analyzed snapshot identified during an analysis task, data representing an entity responsible for the characteristic segment. The output of an attribution task can include responsible entities for characteristic segments for one or more snapshots. The responsible entity for a characteristic segment of source code occurring in a snapshot can be the snapshot itself, a particular developer associated with the snapshot, or a group or team of developers within an organization associated with the snapshot. Each of the worker nodes having an attribution engine can provide the output of an attribution task to the manager node 110, or each worker node can communicate with the data server 130 to store the output of the attribution task in the data storage subsystem.

A user of a user device 160 can initiate analysis and attribution of snapshots in the code base 140 using the user device 160. The user device 160 can provide a request 105 over the network 170 to the manager node 110. The request 105 can be a request for the static analysis system 102 to analyze and attribute snapshots in the code base 140. The request 105 can include a code base identifier corresponding to the code base 140.

When the snapshots 125 in the code base 140 have been analyzed and attributed, the static analysis system 102 can provide analysis and attribution results 115 back to the user device 160 over the network 170. The static analysis results 115 can include information and statistics about violations or other features of source code in the code base 140 that were attributed by the static analysis system 102 to each of multiple responsible entities.

When the manager node 110 receives a request 105 to initiate static analysis on the code base 140, the manager node 110 can distribute analysis tasks and attribution tasks to the worker nodes 120a-n. For example, the manager node 110 can assign a particular analysis task to a worker node having an analysis engine or a particular attribution task to a particular worker node having an attribution engine.

Alternatively, the manager node 110 can maintain a list of all attribution or analysis tasks and advertise the list of tasks to the worker nodes 120a-n. The worker nodes 120a-n can then select available tasks to perform from the list of tasks. The static analysis system 102 may have multiple manager nodes that determine analysis tasks and attribution tasks and communicate the available tasks to the worker nodes 120a-n.

Figure 2:
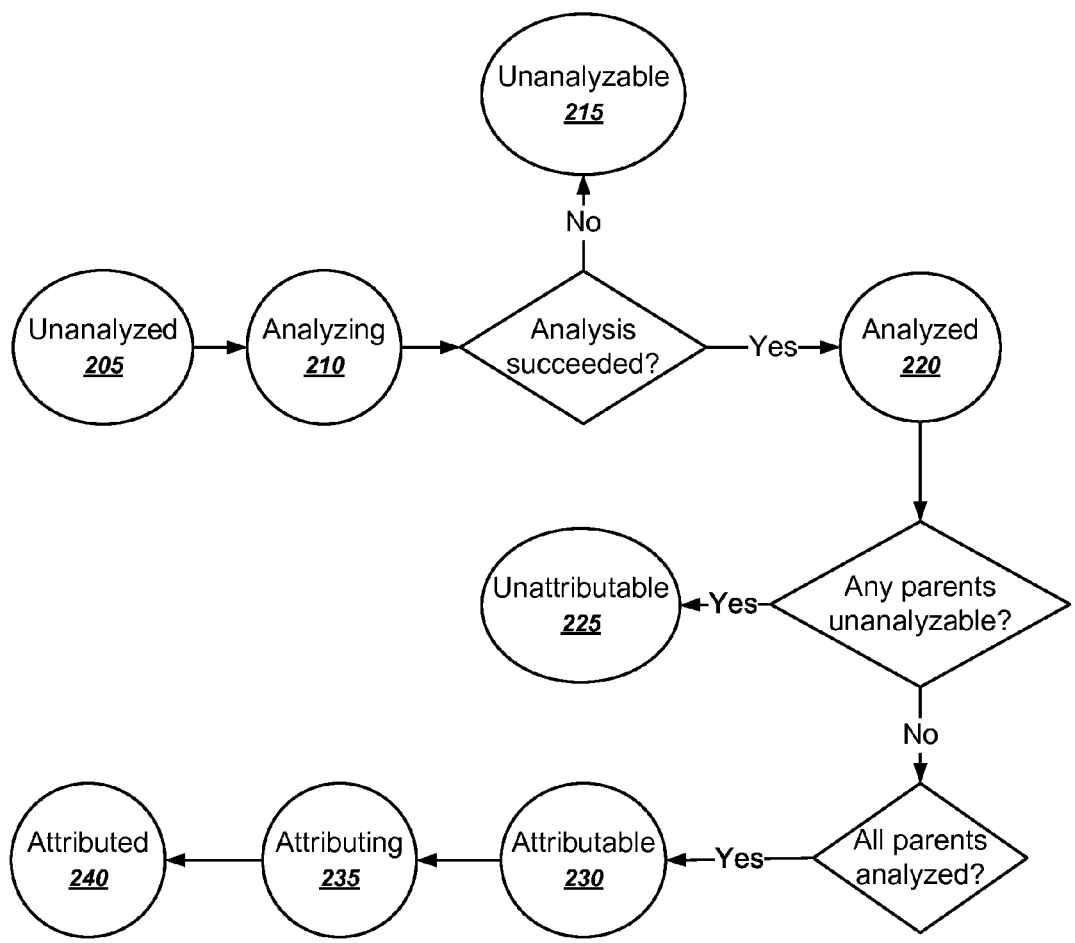
FIG. 2 is a state diagram of snapshot states.

FIG. 2 is a state diagram of snapshot states. A static analysis system can maintain, for each snapshot, state information that represents one of the states shown in FIG. 2. For example, the state information can be maintained by a manager node of the system, e.g., the manager node 110 of FIG. 1. The state information can also be maintained within metadata of the snapshot itself or by a data server within the system, e.g., the data server 130 of FIG. 1. The system can use conventional consistency techniques to ensure that entities in the system agree on the state of a particular snapshot.

A static analysis system can use the state information to synchronize operations on snapshots between multiple worker processes. For example, a snapshot must be analyzed by an analysis task before its characteristic segments can be attributed by an attribution task. Furthermore, all parent snapshots of a first snapshot must be analyzed before the characteristic segments of the first snapshot can be attributed.

A snapshot starts in an unanalyzed state 205. When a snapshot is in the unanalyzed state, a manager node can assign the snapshot to a worker node as an analysis task. The manager node can transition the snapshot to an analyzing state 210 to indicate that a worker node is or is about to commence analyzing the snapshot.

If the analysis succeeds, the manager node can transition the snapshot to an analyzed state 220. If the analysis fails, which can happen for example, if there was an error in building the source code of the snapshot due to source code errors, missing libraries or other dependencies, the manager node can transition the snapshot to an unanalyzable state 215.

If any parents of a snapshot are unanalyzable, e.g., if any parents of the snapshot have the unanalyzable state 215, the manager node can transition the state of the snapshot to an unattributable state 225.

If all parents of the snapshot have been analyzed, i.e., have the analyzed state 220, the manager node can transition the snapshot to an attributable state 230. When a snapshot is in the attributable state 230, the snapshot is available to be assigned to a worker node to be processed by an attribution task. The manager node can transition the snapshot to an attributing state 235 to indicate that a worker node is or is about to commence performing an attribution task on the snapshot.

Because attribution tasks typically involve multiple snapshots, the manager node will generally mark multiple snapshots with the attributing state 235 for a particular attribution task. The manager node can use atomic transaction techniques to ensure that all snapshots for a particular attribution task have the attributing state 235 before assigning the corresponding attribution task. For example, the manager node can roll back a snapshot to the attributable state 230 if at least one snapshot did not successfully change to the attributing state 235.

After the attribution task finishes, the manager node transitions the state of the snapshot to an attributed state 240.

Figure 3:
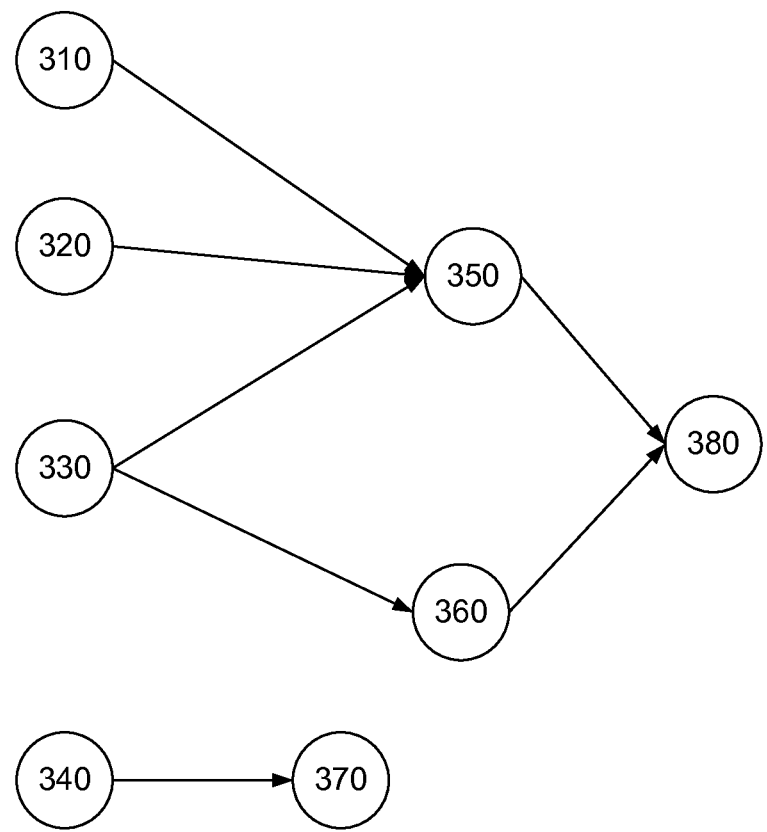
FIG. 3 is a diagram of an example revision graph.

FIG. 3 is a diagram of an example revision graph. In the example graph, each node represents a snapshot and an edge from a first node to a second node represents that the first node represents a parent snapshot to a child snapshot represented by the second node.

Thus, node 380 has nodes 350 and 360 as its parent nodes. Node 350 has node 310, node 320, and node 330 as its parent nodes. Node 360 has node 330 as a parent node. A node will have multiple parent nodes when source code from multiple snapshots is merged into a single snapshot as part of a merge commit.

If node 320 were an unanalyzable snapshot, node 350 would be an unattributable snapshot.

Node 370 has node 340 as its parent, and the nodes are not connected to the rest of the revision graph. Node 340 is unattributable because it has no parent nodes. A static analysis system can still perform analysis tasks for snapshots for nodes 340 and 370 and can still perform an attribution task for node 370 without making any assumptions about the structure or connectivity of the revision graph.

Figure 4:
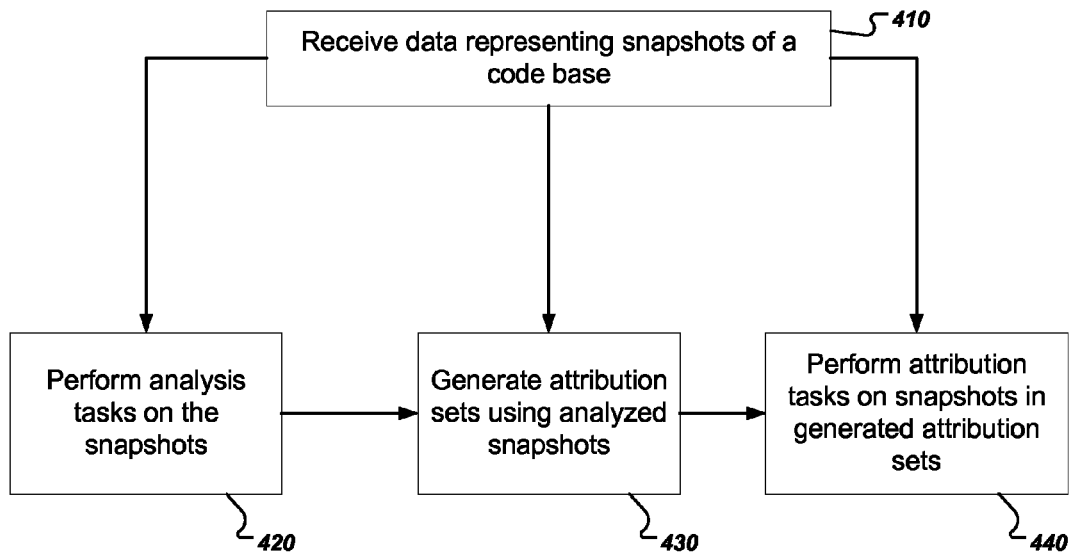
FIG. 4 is a flow chart of an example process for performing distributed analysis and attribution.

FIG. 4 is a flow chart of an example process for performing distributed analysis and attribution. Performing the process, a system can use one or more worker nodes to perform analysis tasks and attribution tasks on snapshots in a code base. The tasks can be performed in parallel by a distributed system having a manager node that distributes tasks to multiple worker nodes. The process will be described as being performed by an appropriately programmed system of one or more computers.

The system receives data representing a plurality of snapshots of a code base (410). The data includes data representing the revision graph between snapshots in the code base, including data indicating which snapshots are parents of other snapshots.

The system performs analysis tasks on the snapshots (420). For example, for each snapshot, the system can build the source code in that snapshot, generate a database that includes information about various code entities defined in the source code, and query the database to identify violations or other features that occur in the source code of the snapshot.

If the analysis task fails, the system can transition a state of the snapshot to an unanalyzable state. If the analysis task succeeds, the system can transition a state of the snapshot to an analyzed state and copy the output of the analysis task or save it in a data storage subsystem.

The system need not complete all analysis tasks on all snapshots before performing attribution tasks for the analyzed snapshots. Rather, the system can begin building attribution sets for attribution tasks as soon as at least some analysis tasks are completed.

The system generates attribution sets using attributable snapshots (430). An attribution set identifies one or more attributable snapshots to be attributed by an attribution task as well as the analyzed parent snapshots that make the one or more snapshots attributable. The system can identify the attributable snapshots by a target set, and the system can identify parent snapshots that are not already in the target set by a support set. In other words, the parent snapshot of an attributable snapshot in the target set may be included in the target set, the support set, or both.

As described above, an attributable snapshot is a snapshot whose parents have all been successfully analyzed by analysis tasks. In other words, all of the snapshot's parent snapshots have, at one time, had an analyzed state. However, the parent snapshots need not currently have an analyzed state for a snapshot to be considered attributable. Rather, the snapshot is attributable if all of the snapshot's parents have, at one time, had an analyzed state. For example, a snapshot can still be considered attributable if one of its parent snapshots has a state of unattributable, attributable, attributing, or attributed.

As the system performs analysis tasks and transitions a state of snapshots from analyzed to attributable, the system can begin generating attribution sets and performing attribution tasks on the attribution sets concurrently with performing analysis tasks on unanalyzed snapshots.

The amount of data for each analyzed snapshot can be very large. Snapshots in the support set but not in the target set, that is, snapshots that occur in the attribution set but that are not yet being attributed, are snapshots whose data will be copied at least twice: once while the snapshot is merely in the support set for a first attribution task and once while the snapshot is in the target set for actually being attributed by a second attribution task. If a snapshot has multiple children, the data for the snapshot may be copied for additional attribution tasks. To reduce redundancy, the target set and support sets are typically disjoint, although they need not be.

Thus, the system can generate attribution sets in way that reduces the amount of data that is transferred to worker nodes for performing attribution tasks. Generally, the system will have a target size for the attribution sets that is based the capacity of each worker node in the system. Given the target size, system can treat generating the attribution sets as an optimization problem having a constraint that every snapshot in a target set needs all of its parent snapshots to occur in either the target set or the support set and having the goal of reducing the number of snapshots that occur in attribution sets but not in target sets. The system can also consider the size of analysis data for individual snapshots and where the data is stored when generating attribution sets.

The system can then obtain a solution to the optimization problem using any appropriate solver, e.g., a satisfiability modulo theory (SMT) solver. Encoding attribution sets in a particular optimization framework may introduce more complexity, but in exchange, may provide a possibly more optimum solution.

In some implementations, the system can reduce the amount of data that is transferred by generating attribution sets that reduce the size of the support sets relative to the size of the target sets. In other words, the system can attempt to generate an attribution set having a particular threshold size by placing as many supporting snapshots as possible in the target sets, rather than in the support sets.

The system can choose the threshold size to balance parallel computing performance of the system against redundant copying of data. For example, larger attribution sets will reduce the data copied, but an attribution set that is too large may overwhelm a single worker node performing the attribution task. Furthermore, smaller attribution sets may result in more parallelism in the system. In some implementations, the system chooses the threshold size to be 10, 30, 50, or 100 snapshots.

After adding a particular snapshot to the target set, the system adds all parent snapshots of the particular snapshot that do not already occur in the target set to the support set. If a snapshot in the support set has its parents somewhere in the attribution set, the system can move the snapshot to the target set.

In some implementations, the system adds the snapshots to attribution sets in a reverse topological order, e.g., by starting with the most recent snapshot, adding its parents, its grandparents, and so on. In some other implementations, the system adds the snapshots to the attribution sets in reverse chronological order according to the commit dates of the snapshots, e.g., by starting with the most recently committed snapshot, then adding the next most recent snapshot, and so on. The system can choose from a number of valid reverse topological orderings.

The system performs an attribution task on snapshots in each of the attribution sets (440). For example, the system can attribute source code violations occurring in snapshots of the target set. Example processes for matching and attributing violations are described in commonly-owned U.S. Patent Application No. 61/983,932, for "Source Code Violation Matching and Attribution," to Henriksen et al., which is incorporated here by reference.

As described above with reference to FIG. 1, a manager node of the system can either assign an attribution task to a particular worker node or advertise the attribution task as being available on a list of tasks. Available worker nodes can then select the attribution task from the list of tasks and perform the attribution task.

After performing an attribution task by attributing characteristic segments for all snapshots in the target set, the system can copy the output of the attribution task to a particular location, e.g., save the output in a data storage subsystem, or return the output to a user.

Figure 5:
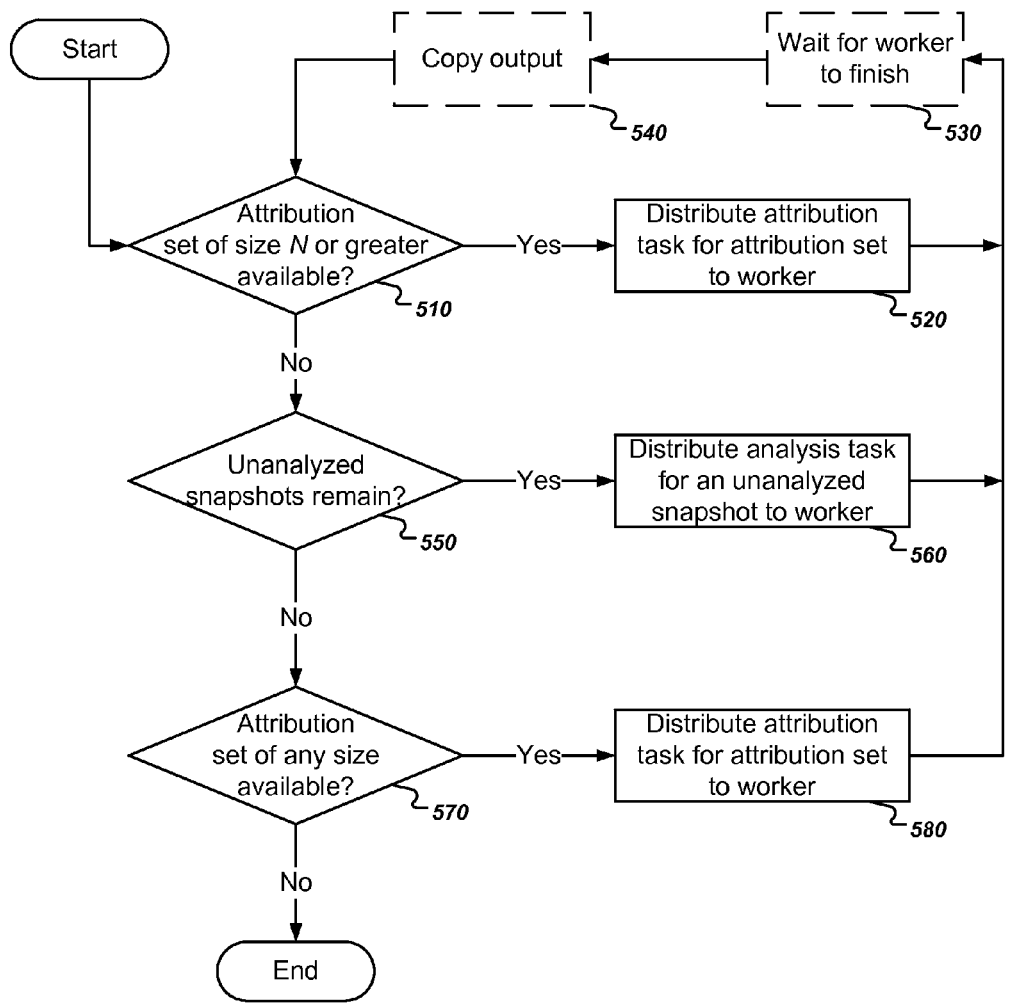
FIG. 5 is a flow chart of an example process for distributing tasks to worker nodes.

FIG. 5 is a flow chart of an example process for distributing tasks to worker nodes. In general, a manager node of a distributed static analysis system can distribute tasks to multiple worker nodes by distributing analysis tasks and by distributing attribution tasks for generated attribution sets. The manager node can, for example, execute the example process within a separate thread for each worker node in the system. The process will be described as being performed by an appropriately programmed system of one or more computers.

The system determines whether an attribution set of size N or greater is available (510). In general, the system will generate the largest available attribution set, up to the size N, using already analyzed snapshots, e.g., snapshots having an attributable state. Thus, the first time the system performs the example process, neither any analyzed nor attributable snapshots may be available.

In this example, N represents the number of distinct snapshots in the target set and support set of the largest available attribution set. Generating the largest available attribution set will be described in more detail below with reference to FIG. 7.

The system can predetermine the value of N based on the capabilities of each worker node. The system can also select a value of N dynamically depending on the capabilities of a particular worker node in the system. The system can also select N dynamically whenever attribution sets are constructed, based on the number of available workers, network throughput, or other resource constraints.

If such an attribution set of size N or larger is available, the system distributes an attribution task for the attribution set to a worker node (branch to 520). To achieve synchronization among multiple competing worker nodes, the system can atomically mark all snapshots in the target set of the attribution set as having an attributing state.

A manager node of the system can then assign an attribution task for the attribution set to a particular worker node. The worker node first obtains snapshot data for all snapshots in the attribution set and then begins the attribution task on snapshots in the target set of the attribution set.

The worker node can copy the snapshot data for all snapshots in the attribution set from a data storage subsystem. The worker node may locally cache snapshot data for snapshots in the support set of the attribution set. Then, if the same worker node is assigned an attribution task for an attribution set having a snapshot that is cached, the worker node need not recopy the snapshot data of that snapshot when performing the attribution task.

When the worker node finishes, the worker node can return the output of the attribution task to the manager node or copy the output to a data storage subsystem and indicate to the manager node that the attribution task has finished. The system can also atomically mark all snapshots that were in the target set as having an attributed state.

The system can optionally wait for the worker node to finish (530). For example, when the manager node has a separate thread executing the example process for each worker node, the thread can wait for its assigned worker node to finish.

The manager node can also optionally copy the output generated by the worker node (540). The worker node can write the output to a data storage subsystem for access by the manager node, or the manager node can copy the output from the data storage subsystem.

If no attribution set of at least size N is available, the system determines whether unanalyzed snapshots remain (branch to 550). The system can determine whether any snapshots represented in the revision graph have an unanalyzed state.

If so, the system can select a next snapshot to be analyzed by a worker node and distribute an analysis task for the unanalyzed snapshot to a worker node (branch to 560). In some implementations, the system also analyzes snapshots according to a particular order, e.g., reverse topological or reverse chronological order.

After the worker node analyzes a snapshot, the system can transition the state of the snapshot from unanalyzed to analyzed. As described above, the manager node thread can optionally wait for the worker node to finish analyzing the selected snapshot (530) and can optionally copy the results of the analysis from the worker node or from a data storage subsystem (540).

If no unanalyzed snapshots remain, the system determines whether an attribution set of any size is available (branch to 570). Because of the ordering of operations in the example process, the last check for an attribution set of any size may be performed one or more times toward the end of the process. If all snapshots are analyzed, the system may generate one final attribution set for the unattributed snapshots. For example if no further analysis tasks are available but some worker nodes are still analyzing snapshots, the system may repeatedly generate attribution sets smaller than size N as the worker nodes complete their analysis tasks. If an attribution set of any size is available, the system distributes an attribution task for an attribution set to a worker node (branch to 580). The worker node will then perform the attribution task on the attribution set.

If no attribution set of any size is available, the process ends.

During the process, the manager node can keep track of which tasks have been assigned to which worker nodes and which of those tasks the worker nodes have successfully completed. If any of the worker nodes fail while performing analysis tasks or attribution tasks, the manager node can reassign the task to another worker node, e.g., when the worker node fails or after the process ends.

Figure 6A:
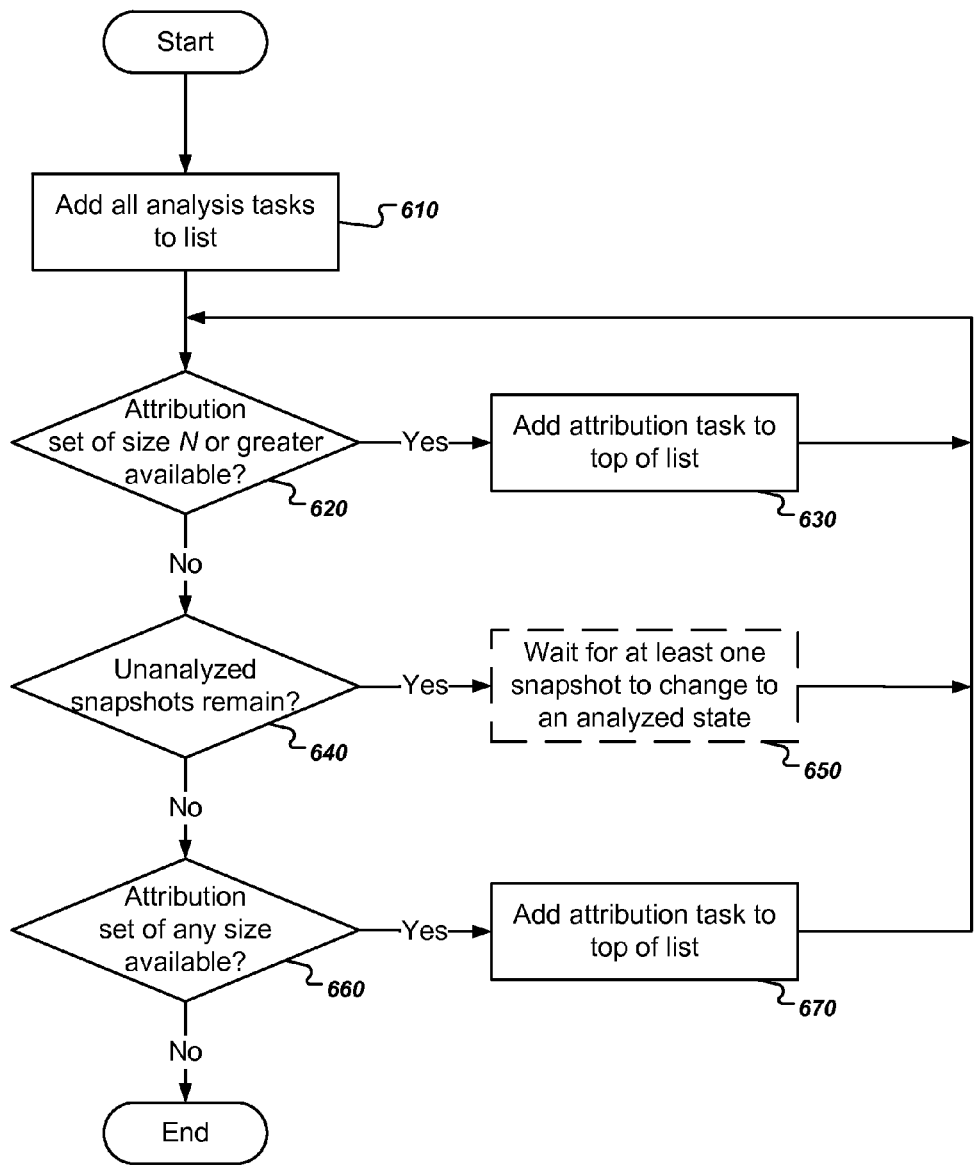
FIG. 6A is a flow chart of an example process for advertising available tasks to worker nodes.

FIG. 6A is a flow chart of an example process for advertising available tasks to worker nodes. Unlike the process in FIG. 5, a manager node need not decide which worker node will handle an attribution or an analysis task. One or more manager nodes can instead advertise the availability of tasks in a list of tasks, and multiple worker nodes can choose to operate on tasks in the list. The process will be described as being performed by an appropriately programmed system of one or more computers.

The system adds all analysis tasks to the list of tasks (610). The system can generate an analysis task for each snapshot in the code base having an unanalyzed state. The system can then add all analysis tasks to the list of tasks.

Worker nodes will generally select available analysis tasks or attribution tasks from the list of tasks. The manager nodes will generally also have the ability to add a task to the top of the list so that the added task is selected next by worker nodes or relatively before other tasks on the list. The list of tasks can be implemented using any appropriate data structure. For example, the list of tasks can be a queue or a stack. A manager node can add new tasks to the front or end of the queue or to the top of a stack. Similarly, worker nodes can select a next task by selecting a task from the front of the queue or off the top of the stack.

The system may also have one list of tasks for analysis tasks and another list of tasks for attribution tasks. For example, in a system where there are worker nodes that perform only analysis tasks or only attribution tasks, each type of worker node can select tasks from the appropriate list.

The system determines whether an attribution set of size N or greater is available (620). Generating the largest available attribution sets will be described in more detail below with reference to FIG. 7.

If such an attribution set of size N or larger is available, the system adds an attribution task to the top of the list of tasks (branch to 630).

A worker node that is available to perform an attribution task can then select the attribution task from the top of the list to begin attributing snapshots in the attribution set. When the worker node begins the attribution task, the worker node can mark snapshots in the attribution set as having an attributing state. The manager node need not wait for the worker nodes to finish before attempting to generate a next attribution set (620).

If no attribution set of at least size N is available, the system determines whether any unanalyzed snapshots remain (branch to 640).

If unanalyzed snapshots remain, the system can wait until more worker nodes have performed analysis tasks on the unanalyzed snapshots. Thus, the system optionally waits for at least one snapshot to change to an analyzed state (650). As soon as a snapshot changes its state from unanalyzed to analyzed, the system can once again try to build an attribution set of size N or greater (620).

If no unanalyzed snapshots remain, the system determines whether an attribution set of any size is available (branch to 660). As described above, this may occur toward the end of the process for a final attribution set.

If an attribution set of any size is available, the system adds an attribution task to the top of the list of tasks (branch to 670). A worker node can then select and perform the final attribution task on the last attribution set.

If no attribution set of any size is available, the process ends.

During the process, the manager node can keep track of which tasks have been claimed by which worker nodes and which of those tasks the worker nodes have successfully completed. If any of the worker nodes fail while performing analysis tasks or attribution tasks, the manager node can again add the task to the list of tasks to be claimed by another worker node.

Figure 6B:
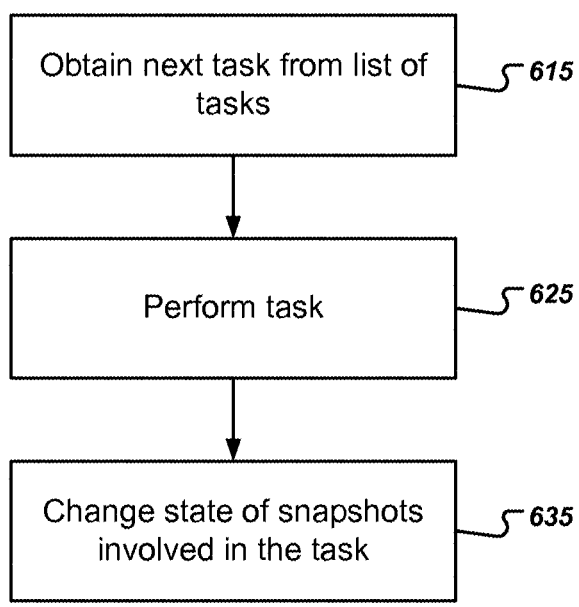
FIG. 6B is a flow chart of an example process for performing a task by a worker node.

FIG. 6B is a flow chart of an example process for performing a task by a worker node. Worker nodes can select tasks from an advertised list of available tasks generated by one or more manager nodes. The process will be described as being performed by an appropriately programmed system of one or more computers.

The system obtains a next task from the list of tasks (615). As described above, the list of tasks can be implemented by any appropriate data structure. Specialized worker nodes that perform only analysis tasks or only attribution tasks may select a next attribution task or a next analysis task from the list of task. By allowing the worker nodes to select which tasks to work on, the worker nodes can avoid being overloaded by one or more manager nodes.

The system performs the task (625). Each worker node performs the analysis task or the attribution task. While or after performing each task, the worker node can write the output of each task to a data storage subsystem.

As described above with reference to FIG. 5, to perform an attribution task on an attribution set, the worker node will copy snapshot data for all snapshots in the attribution set from a data storage subsystem and then begin the attribution task. The worker node may also locally cache data of snapshots in the support set of the attribution set.

The system changes the state of snapshots involved in the task (635). As the worker nodes perform tasks on snapshots, the worker nodes can modify the state of the snapshots. The worker nodes can explicitly notify one or more manager nodes that the state of a snapshot is changing, or the worker nodes can record the change of state elsewhere, e.g., in a database.

Figure 7:
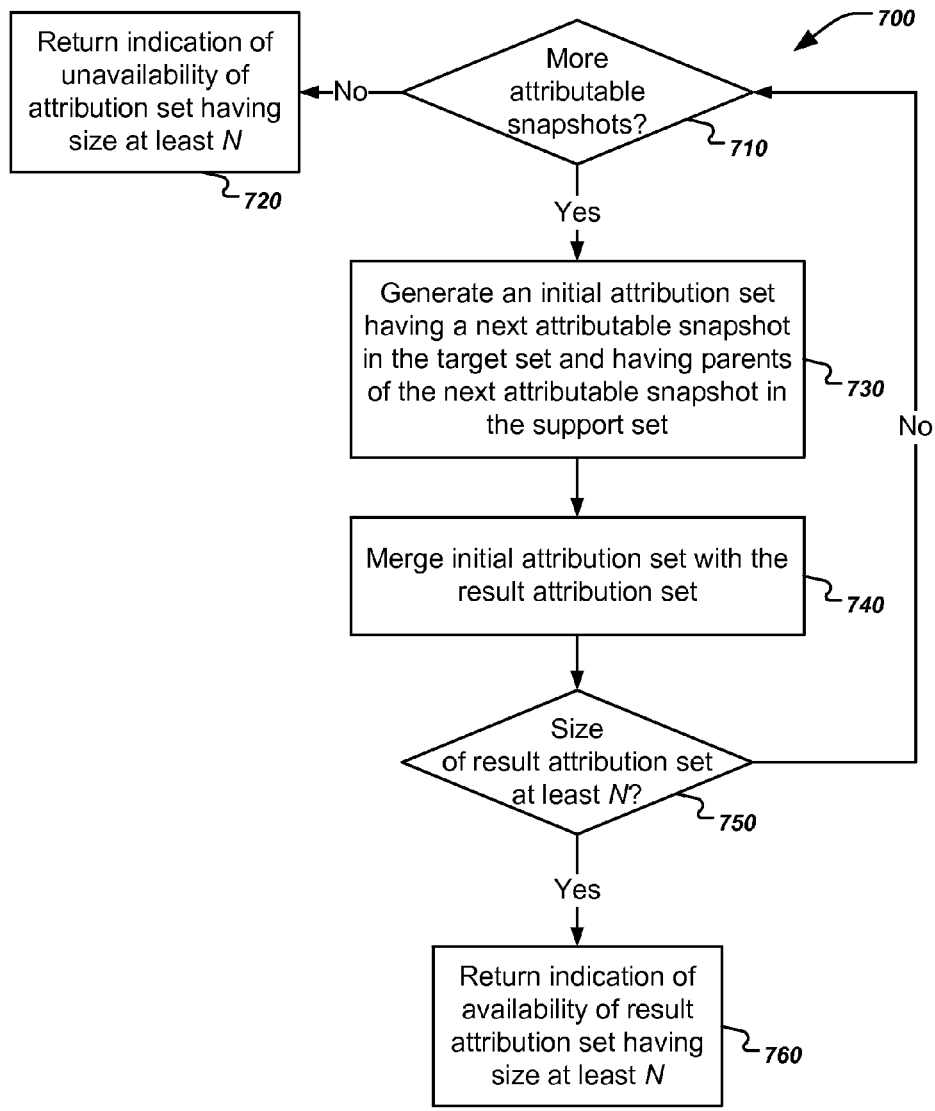
FIG. 7 is a flow chart of an example process for determining whether an attribution set of a particular size can be generated.

FIG. 7 is a flow chart of an example process 700 for determining whether an attribution set of a particular size can be generated. In general, a manager node assembles an attribution set using attributable snapshots, e.g., snapshots for which all parent snapshots have been analyzed. The process will be described as being performed by an appropriately programmed system of one or more computers.

The system determines whether more attributable snapshots are available (710). In this context, the system considers a snapshot to have an attributable state if the snapshot has not already been added to an existing attribution set.

Because an attributable snapshot is a snapshot that has been successfully analyzed and whose parent snapshots have also been successfully analyzed, the first time through the process, no attributable snapshots at all may be available. The system thus may need to perform additional analysis tasks on snapshots in the revision graph to obtain more attributable snapshots.

If no more attributable snapshots are available, the system returns an indication of the unavailability of an attribution set having a size of at least N (branch to 720).

If more attributable snapshots are available, the system generates an initial attribution set having a next attributable snapshot in the target set and having parents of the next attributable snapshot in the support set (branch to 730). As described above, the system can determine a next attributable snapshot according to a particular ordering, which may be determined by the revision graph, e.g., reverse chronological order or reverse topological order.

If a next attributable snapshot is available, the system adds the snapshot to the target set of the initial attribution set and adds all parent snapshots to the support set of the initial attribution set.

The system merges the initial attribution set with the result attribution set (740). The result attribution set is an attribution set being iteratively built by the system through operations of the process 700. Thus, the first time the system attempts to merge the initial attribution set with the result attribution set, the result attribution set may be empty. Merging attribution sets will be described in more detail below with reference to FIG. 8.

After merging the initial attribution set with the result attribution set, the result attribution set will have a size determined by the number of distinct members in the target set and the support set of the result attribution set.

The system determines whether the size of the result attribution set is at least N (750). If so, the system returns an indication of the availability of the result attribution set having a size of at least N (branch to 760).

If not, the system again determines whether more attributable snapshots are available (branch to 710). Because the system can perform analysis tasks and attribution tasks in parallel using a distributed system of worker nodes, by the time the process returns to step 710, more attributable snapshots may be available than were available the previous time the system checked for attributable snapshots.

Figure 8:
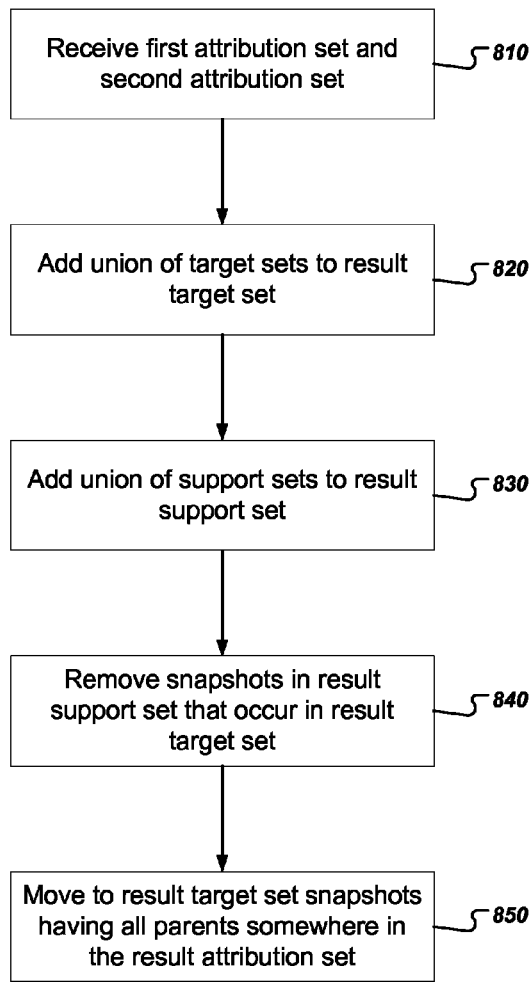
FIG. 8 is a flow chart of an example process for merging attribution sets.

FIG. 8 is a flow chart of an example process for merging attribution sets. In general, the system receives a first attribution set and a second attribution set and forms a union of the two sets to generate a result attribution set. Because the snapshots in the target set and support set of a particular attribution set have a particular kind of relationship, namely, that all parents of snapshots in the target set occur somewhere in the attribution set, the system can merge, i.e., form the unions of, the attribution sets in a particular way. The process will be described as being performed by an appropriately programmed system of one or more computers.

The system receives a first attribution set and a second attribution set (810). As described above, one of the attribution sets may be an initial attribution set for a single attributable snapshot, and the other attribution set may be a result attribution set being built for an attribution task.

For example, as shown in FIG. 3, the system can receive a first attribution set corresponding to node 380. The first attribution set would then include:

first target set: {380}
first support set: {350, 360}

The system can receive a second attribution set corresponding to node 350. Thus, the second attribution set would include:

second target set: {350}
second support set: {310, 320, 330}

The system adds the union of the target sets to the result target set (820). In other words, the system computes the union of the target sets of both the first attribution set and the second attribution set and assigns it to the result target set. Thus, the result attribution set would include:

result target set: {350, 380}.

The system adds the union of the support sets to the result support set (830), which initially may be empty. That is, the system computes the union of the support sets of both the first attribution set and the second attribution set and assigns it to the result support set, if the result set is empty. Thus, the result support set would include:

result support set: {350, 360, 310, 320, 330}.

The system removes from the result support set any snapshots in the result support set that occur in the result target set (840). Thus, because node 350 occurs in both the result target set and the result support set, the system removes node 350 from the result support set. The result support set would thus include:

result support set: {360, 310, 320, 330}.

The system moves to the result target set snapshots all of whose parents are found somewhere in the result attribution set (850). In other words, if all parents of a particular snapshot are already in the support set or the target set, the system can add the particular snapshot to the target set. The system may also remove the added snapshot from the result support set.

In the example of FIG. 3, all parents of node 360, in other words, node 330, are already included in the result support set. Thus, the system can add node 360 to the result target set and remove it from the result support set. The final result attribution set would thus include:

result target set: {350, 360, 380}
result support set: {310, 320, 330}

In particular, even though the first attribution set and the second attribution set had only one snapshot each in their respective target sets, the result target set has three snapshots in its target set due to the relationship between the target sets and support sets being merged.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
a manager node and a plurality of worker nodes, wherein:
the manager node comprises one or more computers and one or more storage devices storing instructions that are operable, when executed by the one or more computers, to cause the manager node to perform operations comprising:
receiving a request to perform attribution tasks on a plurality of snapshots of a code base, wherein performing an attribution task on a snapshot comprises attributing characteristic segments of source code in the snapshot to respective responsible entities,
receiving data representing a revision graph, the revision graph representing parent and child relationships between snapshots of the code base, wherein a child snapshot is a subsequent snapshot of a parent snapshot in the code base,
generating an attribution set having at most N snapshots of the revision graph, wherein N is an integer greater than zero, the attribution set having a target subset of attributable snapshots and a support subset of parent snapshots of snapshots in the target subset, the snapshots in the support subset including one or more parent snapshots that do not occur in the target subset, and
submitting an attribution task for the attribution set to one worker node of the plurality of worker nodes; and
each worker node of the plurality of worker nodes comprises one or more computers and one or more storage devices storing instructions that are operable, when executed by the one or more computers, to cause the worker node to perform operations comprising, for each attribution set provided to the worker node:
copying, to the worker node for each snapshot in the attribution set, analysis data that identifies characteristic segments of source code in the snapshot; and
attributing each characteristic segment of source code in each snapshot in the attribution set to a respective responsible entity.

2. The system of claim 1, wherein submitting the attribution task for the attribution set to one worker node of the plurality of worker nodes comprises distributing the attributing task to a particular worker node of the plurality of worker nodes.

3. The system of claim 1, wherein submitting the attribution task for the attribution set to one worker node of the plurality of worker nodes comprises adding an attribution task for the attribution set to a list of tasks for performance by a worker node of a plurality of worker nodes.

4. The system of claim 1, wherein the manager node is configured to perform operations comprising:
determining that an attribution set of size N is not available according to attributable snapshots in the code base; and
in response to determining that an attribution set of size N is not available according to attributable snapshots in the code base, submitting an analysis task for a next unanalyzed snapshot to a particular worker node of a plurality of worker nodes.

5. The system of claim 1, wherein the characteristic segments of source code are segments of source code that have coding defects that violate one or more source code coding standards.

6. The system of claim 1, wherein the manager node is configured to perform operations comprising:
modifying a state of all snapshots in the attribution set from an attributable state to an attributing state, wherein a snapshot having an attributing state represents a snapshot currently allocated to an existing attribution task.

7. The system of claim 1, wherein the manager node is configured to perform operations comprising:
determining that all parent snapshots of a particular snapshot have been analyzed; and
in response to determining that all parent snapshots of a particular snapshot have been analyzed, modifying a state of the particular snapshot from an analyzed state to an attributable state.

8. The system of claim 1, wherein generating the attribution set comprises:
adding snapshots in the code base to the attribution set according to a particular order according to the revision graph.

9. The system of claim 8, wherein the particular order is reverse chronological or reverse topological order.

10. The system of claim 1, wherein generating an attribution set comprises:
selecting a next attributable snapshot;
generating a first attribution set having the selected next attributable snapshot in a first target subset of the first attribution set and having all parent snapshots of the next snapshot in a first support subset of the first attribution set; and
merging the first attribution set with a result attribution set.

11. The system of claim 10, wherein merging the first attribution set with the result attribution set comprises:
adding, to a result target subset of the result attribution set, a first union of a first target subset of the first attribution set and the result target subset of the result attribution set;
adding, to a result support subset of the result attribution set, a second union of a first support subset of the first attribution set and the result support subset of the result attribution set; and
removing, from the result support subset, any snapshots that also occur in the result target subset.

12. The system of claim 11, wherein the manager node is configured to perform operations comprising:
identifying a particular snapshot that has all parent snapshots in the result target subset or result support subset;
adding, to the result target subset, the particular snapshot; and
removing the particular snapshot from the result support subset.

13. The system of claim 1, wherein the manager node is configured to perform operations comprising:
determining that no unanalyzed snapshots remain in the code base; and
in response to determining that no unanalyzed snapshots remain in the code base, generating an attribution set of one or more remaining attributable snapshots; and
submitting an attribution task for the attribution set to a particular worker node of a plurality of worker nodes.

14. The system of claim 1, wherein generating the attribution set comprises:
encoding one or more constraints of the attribution set into an optimization framework, including a first constraint that specifies that each particular snapshot in a target subset needs all parent snapshots of the particular snapshot to occur in the target subset or the support subset; and
using an optimization solver of the optimization framework to obtain the attribution set.

15. A computer-implemented method comprising:
receiving, by a manager node, a request to perform attribution tasks on a plurality of snapshots of a code base, wherein performing an attribution task on a snapshot comprises attributing characteristic segments of source code in the snapshot to respective responsible entities;
receiving, by the manager node, data representing a revision graph, the revision graph representing parent and child snapshots between snapshots of the code base, wherein a child snapshot is a subsequent snapshot of a parent snapshot in the code base;

generating, by the manager node, an attribution set having at most N snapshots of the revision graph, wherein N is an integer greater than zero, the attribution set having a target subset of attributable snapshots to be attributed and a support subset of all parent snapshots of snapshots in the target subset, the snapshots in the support subset including one or more parent snapshots that do not occur in the target subset;

submitting, by the manager node, an attribution task for the attribution set to one worker node of a plurality of worker nodes;

copying, to the worker node for each snapshot in the attribution set, analysis data that identifies characteristic segments of source code in the snapshot; and attributing, by the worker node, each characteristic segment of source code in each snapshot in the attribution set to a respective responsible entity.

16. The method of claim 15, wherein submitting the attribution task for the attribution set to one worker node of the plurality of worker nodes comprises distributing an attribution task for the attribution set to a particular worker node of a plurality of worker nodes.

17. The method of claim 15, wherein submitting the attribution task for the attribution set to one worker node of the plurality of worker nodes comprises adding an attribution task for the attribution set to a list of tasks for performance by a worker node of a plurality of worker nodes.

18. The method of claim 15, further comprising:
modifying a state of all snapshots in the attribution set from an attributable state to an attributing state, wherein a snapshot having an attributing state represents a snapshot currently allocated to an existing attribution task.

19. The method of claim 15, further comprising:
determining that all parent snapshots of a particular snapshot have been analyzed; and
in response to determining that all parent snapshots of a particular snapshot have been analyzed, modifying a state of the particular snapshot from an analyzed state to an attributable state.

20. The method of claim 15, wherein generating the attribution set comprises:
adding snapshots in the code base to the attribution set according to a particular order according to the revision graph.

21. The method of claim 20, wherein the particular order is reverse chronological or reverse topological order.

22. The method of claim 15, wherein generating an attribution set comprises:
determining that an attribution set of size N is available according to attributable snapshots in the code base.

23. The method of claim 15, wherein generating an attribution set comprises:
selecting a next attributable snapshot;
generating a first attribution set having the selected next attributable snapshot in a first target subset of the first attribution set and having all parent snapshots of the next snapshot in a first support subset of the first attribution set; and
merging the first attribution set with a result attribution set.

24. The method of claim 23, wherein merging the first attribution set with the result attribution set comprises:
adding, to a result target subset of the result attribution set, a first union of a first target subset of the first attribution set and the result target subset of the result attribution set;
adding, to a result support subset of the result attribution set, a second union of a first support subset of the first attribution set and the result support subset of the result attribution set; and
removing, from the result support subset, any snapshots that also occur in the result target subset.

25. The method of claim 24, further comprising:
identifying a particular snapshot that has all parent snapshots in the result target subset or result support subset;
adding, to the result target subset, the particular snapshot; and
removing the particular snapshot from the result support subset.

26. The method of claim 15, further comprising:
determining that an attribution set of size N is not available according to attributable snapshots in the code base; and
in response to determining that an attribution set of size N is not available according to attributable snapshots in the code base, submitting an analysis task for a next unanalyzed snapshot to a particular worker node of the plurality of worker nodes.

27. The method of claim 15, further comprising:
determining that no unanalyzed snapshots remain in the code base; and
in response to determining that no unanalyzed snapshots remain in the code base, generating an attribution set of one or more remaining attributable snapshots; and
submitting an attribution task for the attribution set to a particular worker node of a plurality of worker nodes.

28. The method of claim 15, wherein generating the attribution set comprises:
encoding one or more constraints of the attribution set into an optimization framework, including a first constraint that specifies that each particular snapshot in a target subset needs all parent snapshots of the particular snapshot to occur in the target subset or the support subset; and
using an optimization solver of the optimization framework to obtain the attribution set.

29. The method of claim 15, wherein the characteristic segments of source code are segments of source code that have coding defects that violate one or more source code coding standards.

30. A computer-implemented method comprising:
receiving data representing a plurality of snapshots of a code base, wherein each snapshot comprises source code files, wherein one or more snapshots have a parent snapshot in the code base according to a revision graph of snapshots in the code base;
generating an attribution set from the plurality of snapshots, the attribution set having a target subset of attributable snapshots to be attributed and a support subset of all parent snapshots of all snapshots in the target subset; and
submitting an attribution task for the attribution set to a first worker node of a plurality of worker nodes;
copying, to the first worker node for each snapshot in the attribution set, analysis data that identifies characteristic segments of source code in the snapshot;

attributing, by the first worker node, the characteristic segments of source code in each snapshot to a responsible entity;

determining that an attribution set of size N is not available according to attributable snapshots in the code base, wherein N is an integer greater than zero; and in response to determining that an attribution set of size N is not available according to attributable snapshots in the code base, submitting an analysis task for a next unanalyzed snapshot to a second worker node of the plurality of worker nodes.

31. The method of claim 30, wherein submitting the attribution task for the attribution set to a first worker node of the plurality of worker nodes comprises distributing an attribution task for the attribution set to the first worker node of a plurality of worker nodes.

32. The method of claim 30, wherein submitting the attribution task for the attribution set to a first worker node of the plurality of worker nodes comprises adding an attribution task for the attribution set to a list of tasks for performance by a worker node of a plurality of worker nodes.

33. The method of claim 30, further comprising:
modifying a state of all snapshots in the attribution set from an attributable state to an attributing state, wherein a snapshot having an attributing state represents a snapshot currently allocated to an existing attribution task.

34. The method of claim 30, further comprising:
determining that all parent snapshots of a particular snapshot have been analyzed; and in response to determining that all parent snapshots of a particular snapshot have been analyzed, modifying a state of the particular snapshot from an analyzed state to an attributable state.

35. The method of claim 30, wherein generating the attribution set from the plurality of snapshots comprises:
adding snapshots in the code base to the attribution set according to a particular order according to the revision graph.

36. The method of claim 35, wherein the particular order is reverse chronological or reverse topological order.

37. The method of claim 30, wherein generating an attribution set from the plurality of snapshots comprises:
selecting a next attributable snapshot;
generating a first attribution set having the selected next attributable snapshot in a first target subset of the first attribution set and having all parent snapshots of the next snapshot in a first support subset of the first attribution set; and
merging the first attribution set with a result attribution set.

38. The method of claim 37, wherein merging the first attribution set with the result attribution set comprises:
adding, to a result target subset of the result attribution set, a first union of a first target subset of the first attribution set and the result target subset of the result attribution set;
adding, to a result support subset of the result attribution set, a second union of a first support subset of the first attribution set and the result support subset of the result attribution set; and
removing, from the result support subset, any snapshots that also occur in the result target subset.

39. The method of claim 38, further comprising:
identifying a particular snapshot that has all parent snapshots in the result target subset or result support subset;
adding, to the result target subset, the particular snapshot; and removing the particular snapshot from the result support subset.

40. The method of claim 30, further comprising:
determining that no unanalyzed snapshots remain in the code base; and in response to determining that no unanalyzed snapshots remain in the code base, generating an attribution set of one or more remaining attributable snapshots; and submitting an attribution task for the attribution set to a particular worker node of a plurality of worker nodes.

41. The method of claim 30, wherein generating the attribution set from the plurality of snapshots comprises:
encoding one or more constraints of the attribution set into an optimization framework, including a first constraint that specifies that each particular snapshot in a target subset needs all parent snapshots of the particular snapshot to occur in the target subset or the support subset; and using an optimization solver of the optimization framework to obtain the attribution set.

42. The method of claim 30, wherein the characteristic segments of source code are segments of source code that have coding defects that violate one or more source code coding standards.

43. A system comprising:
one or more computers and one or more storage devices storing instructions that are operable, when executed by the one or more computers, to cause the one or more computers to perform operations comprising:

receiving data representing a plurality of snapshots of a code base, wherein each snapshot comprises source code files, wherein one or more snapshots have a parent snapshot in the code base according to a revision graph of snapshots in the code base;

generating an attribution set from the plurality of snapshots, the attribution set having a target subset of attributable snapshots to be attributed and a support subset of all parent snapshots of all snapshots in the target subset; and submitting an attribution task for the attribution set to a first worker node of a plurality of worker nodes;

copying, to the first worker node for each snapshot in the attribution set, analysis data that identifies characteristic segments of source code in the snapshot;

attributing, by the first worker node, the characteristic segments of source code in each snapshot to a responsible entity;

determining that an attribution set of size N is not available according to attributable snapshots in the code base, wherein N is an integer greater than zero; and in response to determining that an attribution set of size N is not available according to attributable snapshots in the code base, submitting an analysis task for a next unanalyzed snapshot to a second worker node of the plurality of worker nodes.

44. The system of claim 43, wherein submitting the attribution task for the attribution set to a first worker node of the plurality of worker nodes comprises distributing an attribution task for the attribution set to the first worker node of a plurality of worker nodes.

45. The system of claim 43, wherein submitting the attribution task for the attribution set to a first worker node of the plurality of worker nodes comprises adding an attribution task for the attribution set to a list of tasks for performance by a worker node of a plurality of worker nodes.

46. The system of claim 43, wherein the operations further comprise:
modifying a state of all snapshots in the attribution set from an attributable state to an attributing state, wherein a snapshot having an attributing state represents a snapshot currently allocated to an existing attribution task.

47. The system of claim 43, wherein the operations further comprise:
determining that all parent snapshots of a particular snapshot have been analyzed; and
in response to determining that all parent snapshots of a particular snapshot have been analyzed, modifying a state of the particular snapshot from an analyzed state to an attributable state.

48. The system of claim 43, wherein generating the attribution set from the plurality of snapshots comprises:
adding snapshots in the code base to the attribution set according to a particular order according to the revision graph.

49. The system of claim 48, wherein the particular order is reverse chronological or reverse topological order.

50. The system of claim 43, wherein generating an attribution set from the plurality of snapshots comprises:
selecting a next attributable snapshot;
generating a first attribution set having the selected next attributable snapshot in a first target subset of the first attribution set and having all parent snapshots of the next snapshot in a first support subset of the first attribution set; and
merging the first attribution set with a result attribution set.

51. The system of claim 50, wherein merging the first attribution set with the result attribution set comprises:
adding, to a result target subset of the result attribution set, a first union of a first target subset of the first attribution set and the result target subset of the result attribution set;
adding, to a result support subset of the result attribution set, a second union of a first support subset of the first attribution set and the result support subset of the result attribution set; and
removing, from the result support subset, any snapshots that also occur in the result target subset.

52. The system of claim 51, wherein the operations further comprise:
identifying a particular snapshot that has all parent snapshots in the result target subset or result support subset;
adding, to the result target subset, the particular snapshot; and
removing the particular snapshot from the result support subset.

53. The system of claim 43, wherein the operations further comprise:
determining that no unanalyzed snapshots remain in the code base; and
in response to determining that no unanalyzed snapshots remain in the code base, generating an attribution set of one or more remaining attributable snapshots; and
submitting an attribution task for the attribution set to a particular worker node of a plurality of worker nodes.

54. The system of claim 43, wherein generating the attribution set from the plurality of snapshots comprises:
encoding one or more constraints of the attribution set into an optimization framework, including a first constraint that specifies that each particular snapshot in a target subset needs all parent snapshots of the particular snapshot to occur in the target subset or the support subset; and
using an optimization solver of the optimization framework to obtain the attribution set.

55. The system of claim 43, wherein the characteristic segments of source code are segments of source code that have coding defects that violate one or more source code coding standards.

* * * * *